US012775477B1

(12) United States Patent
Nedunuri

(10) Patent No.: US 12,775,477 B1
(45) Date of Patent: Oct. 27, 2026

(54) INTERFACE INTEGRATION TECHNIQUES

(71) Applicant: THE HUNTINGTON NATIONAL BANK, Columbus, OH (US)

(72) Inventor: Srinivas Nedunuri, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/272,438

(22) Filed: Jul. 17, 2025

(51) Int. Cl.
*G06F 9/451* (2018.01)
*G06F 9/54* (2006.01)
*G06F 21/57* (2013.01)
*H04L 9/40* (2022.01)

(52) U.S. Cl.
CPC .............. *G06F 9/451* (2018.02); *G06F 9/541* (2013.01); *G06F 21/577* (2013.01); *H04L 63/1433* (2013.01); *G05B 2219/34256* (2013.01); *G06F 2221/033* (2013.01)

(58) Field of Classification Search
CPC ........ G06F 9/451; G06F 21/577; G06F 9/541; G06F 2221/033; G05B 2219/34256; H04L 63/1433
See application file for complete search history.

(56) References Cited

U.S. PATENT DOCUMENTS 11,108,803 B2 * 8/2021 Wilton ................ H04L 63/0281
11,556,607 B2 * 1/2023 Murray ................... H04L 63/08
12,255,788 B1 * 3/2025 Pistilli ..................... H04L 43/16
2017/0220805 A1 * 8/2017 Ng ........................ G06F 21/577
2017/0264631 A1 * 9/2017 Eggert ................ H04L 63/1433
2020/0175172 A1 * 6/2020 Parsons ................. G06F 21/577
2021/0112088 A1 * 4/2021 Ramasamy ......... H04L 63/1433
2022/0006829 A1 * 1/2022 Nikam .................... H04L 67/02
2022/0093003 A1 * 3/2022 Ablon ................ G09B 19/0053
2023/0093304 A1 * 3/2023 Brasburg ............ G06F 21/6218
717/120
2023/0106091 A1 * 4/2023 Shivashankara ........ G06F 9/541
719/328
2023/0266969 A1 * 8/2023 Mohan .................... G06F 9/547
712/209
2024/0118946 A1 * 4/2024 Take ......................... G06F 8/30
2024/0256435 A1 * 8/2024 Jain ......................... G06F 9/541
2024/0403437 A1 * 12/2024 Szigeti .................. G06F 21/577
2024/0403439 A1 * 12/2024 Shpilyuck ............. G06F 21/554
(Continued)

*Primary Examiner* — Patrick F Riegler
(74) *Attorney, Agent, or Firm* — Kilpatrick Townsend & Stockton LLP

(57) ABSTRACT

In some implementations, techniques may include causing a graphical user interface to be displayed on a display device. The graphical user interface can include a first field for displaying applications of a first service and a second field for displaying application programming interfaces (APIs) of a second service. In addition, the techniques may include receiving information identifying a first application of the first service and information identifying a first application programming interface of the second service via the graphical user interface. The techniques may include establishing communication between the first application and the second service. Moreover, the techniques may include causing the second service to perform an operation with respect to the first application. The techniques can include corresponding methods, devices, systems, and non-transitory computer readable mediums.

20 Claims, 9 Drawing Sheets

(56) References Cited

U.S. PATENT DOCUMENTS

| | | | | |
|---|---|---|---|---|
| 2025/0071189 | A1* | 2/2025 | Sharma | H04L 67/02 |
| 2025/0103401 | A1* | 3/2025 | Singh | G06F 11/3688 |
| 2025/0112907 | A1* | 4/2025 | McGuinness | H04L 63/0807 |
| 2025/0138912 | A1* | 5/2025 | Tricot | G06F 9/453 |
| 2025/0272408 | A1* | 8/2025 | Pickens | G06F 21/577 |
| 2026/0111647 | A1* | 4/2026 | Kidambi | G06F 9/547 |

* cited by examiner

400

500

600

INTERFACE INTEGRATION TECHNIQUES

BACKGROUND

Various operations may be provided by a service, and, for example, a service may analyze software targets to identify and correct security vulnerabilities. The service may require an application programming interface in order to access targets within a private network. However, generating an application programming interface to allow communication between two services can require using multiple interfaces to configure multiple computing devices across different networks. Accordingly, improvements to generating and configuring application programming interfaces are desirable.

BRIEF SUMMARY

The disclosed techniques may include causing a graphical user interface to be displayed on a display device. The graphical user interface can include a first field for displaying applications of a first service and a second field for displaying application programming interfaces (APIs) of a second service. In addition, the techniques may include receiving information identifying a first application of the first service and information identifying a first application programming interface of the second service via the graphical user interface. The techniques may include establishing communication between the first application and the second service. Moreover, the techniques may include causing the second service to perform an operation with respect to the first application.

Implementations of these techniques can include corresponding methods, computer systems, apparatus, and computer programs recorded on one or more transitory or non-transitory computer storage devices (e.g., computer readable media), each configured to perform the actions of the techniques.

BRIEF DESCRIPTION OF THE DRAWINGS

Various embodiments in accordance with the present disclosure will be described with reference to the drawings, in which.

DETAILED DESCRIPTION

Figure 1:
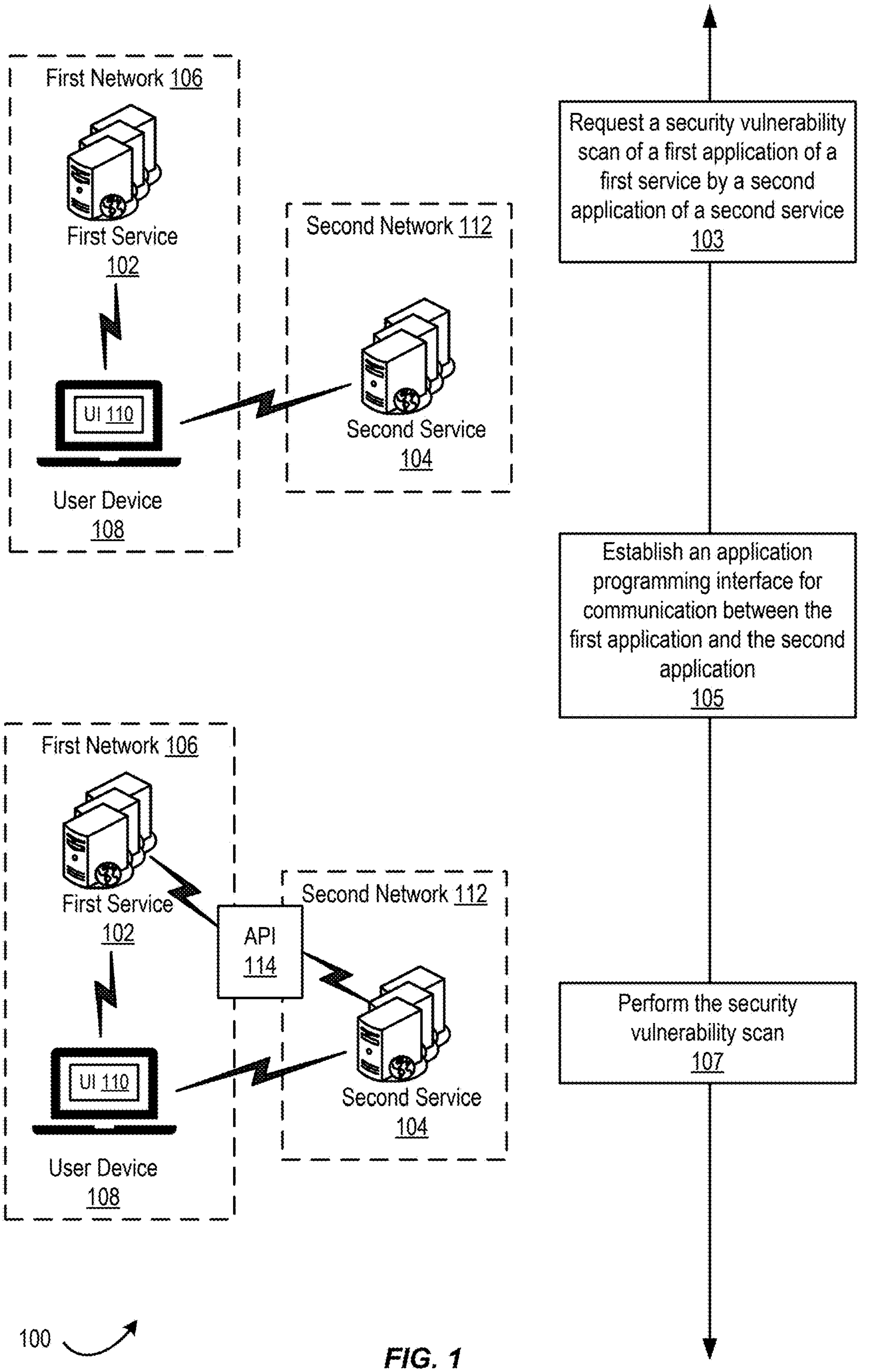
FIG. 1 is an example flow for establishing an application programming interface according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to interfaces for facilitating integration between services. The services may each use separate private networks to perform various functions, and computing devices within these networks may use private addresses that are not publicly addressable. An interface, such as an application programming interface, can facilitate communication with a computing device in a private network because the interface can be an entry point to the private network and the interface can route communication to a computing device with a private address.

Creating an application programming interface (API) to permit communication within a network can expose the network to potential security vulnerabilities. An application programming interface is an entry point to a network, and an improperly configured interface can allow an unauthorized user to access the network. For example, an application programming interface that permits broad access to the network may allow an unauthorized user to access sensitive information within the network. In addition, an application programming interface that is too restrictive may not permit an authorized user with appropriate access to the network.

Creating an application programming interface for communication between two services can be improved by providing a graphical user interface. The user interface can allow a user to manage an application programming interface through a single endpoint. Without the graphical user interface, a user may have to interact with interfaces for both services in order to manage an application programming interface for communication between the two services. Using a single interface can reduce the amount of input that is required to create an application programming interface.

The graphical user interface can improve network security by limiting the number of users that are directly provided with access credentials (e.g., an identifier and an access token). Access credentials for an application of a first service may need to be provided to a second service in order to permit access to the first service's network. Generally, a user would obtain the access credentials from the first service and the user would grant access to the second service by providing the access credentials to the second service. The user can potentially use the access credentials for improper purposes, or the user could provide the access credential to an improper endpoint. Instead, the user can identify the application and the second service via the graphical user interface, and the interface can provide the credentials directly to the second service without exposing the credentials to the user. Therefore, the graphical user interface can improve the security of a computer system.

In an illustrative example, a developer is writing code for an application using a repository that is located within a first service's network. The developer would like to use a second service to analyze the code, but the repository code cannot be accessed by the second service because the repository is located in the first service's private network. The developer accesses a graphical user interface for the first service that can be used to enable communication between the two services. The graphical user interface includes a first field that identifies different applications within the first service, and a second field that identifies application programming interfaces between the first service and the second service. The developer uses the first field to select the application that she would like to be scanned, and she uses the second filed to select a previous application programming interface that she used to scan another application. The developer then uses the graphical user interface to submit a request for a new application programming interface to both services. The request includes address and authentication information for the application, that was retrieved using the input to the first field, and settings for the application programming interface, that was retrieved using the input to the second field. An application programming interface is created in response to the request, and the developer can instruct the second service to perform a scan of the application via the application programming interface.

The graphical user interface can be used to reassign an existing application programming interface from a first task to a second task. For example, an application programming interface that was used to enable a scan of a first application can be reassigned to enable scans of a second application. Reassigning an application programming interface can provide a technical improvement because a reassigning an application programming interface can be quicker than creating a new interface. Application programming interfaces may be hosted on server computers within the first service, the second service, or both, and creating a new interface may require provisioning a new server. Provisioning a new server can take anywhere from 20 minutes to several days, but an application programming interface may be reassigned within a shorter period of time (e.g., 1 minute, 2 minutes, 3 minutes, 4 minutes, 5 minutes, and 10 minutes). Reassigning an application programming interface may only involve providing new settings, addresses, and authentication information to an existing application programming interface. Reassigning an application programming interface can also preserve bandwidth, because provisioning a new server to act as an application programming interface may include providing the new settings, addresses, and authentication information. Provisioning a new server may require providing an API framework and the required dependencies in addition to the settings, addresses, and authentication information. Therefore, reprovisioning an existing application programming interface can reduce the bandwidth that is required to enable a scan of a first service's application by a second service.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for establishing an application programming interface according to at least one embodiment. At block 103, an application programming interface (API) 114 for communicating between a first application of a first service 102 and a second application of the second service 104 can be established. The API 114 can use information that is provided via a UI 110 to establish the API 114. The API 114 may be established by any combination of the first service 102 or the second service 104 in various embodiments. The information that was provided via UI 110 can identify a first application of the first service 102 and an API of the second service 104. In some embodiments, establishing the API 114 can include associating the first application and the API of the second service. In some embodiments, establishing the API 114 can include instructing the second service to create a second API using the settings of the first API and associating the second API (e.g., API 114) with the first application.

At block 105, a security vulnerability scan of a first application by a second application can be requested via the API. The first application can be an application of a first service 102, and the second application can be an application of a second service 104. The first service 102 may be within a first network 106, and the first application may only be accessible by devices that are within the first network 106. For example, the first network may be a private network (e.g., a local area network (LAN) or a virtual private cloud network) that uses private addresses that are not routable from the Internet. The private addresses can be addresses from the private range of addresses that are defined in the IPV4 or IPv6 specifications.

The request for a vulnerability scan can be received at the second service 104 from a user device 108. The user device 108 can be any computing device that is associated with the first network 106. The request can be received via a user interface (UI) 110 that is presented on a display of the user device 108. The request can include information that identifies the first application of the first service 102, and the second application of the second service 104. The second service 104 can be part of a second network 112, and a vulnerability scan, or another operation between the two applications, can require communication between the first network 106 and the second network 112. However, communication to some devices within the first network 106 or the second network 112 may require access to encryption information and private addresses. This information can be provided via the user interface 110.

At block 107, a vulnerability scan can be performed. The first service 102 can establish a connection with the second service 104 via the API 114. To perform the vulnerability scan, the first service 102 can provide the second service 104 with access to a code repository in the first service 102. The second service 104 may analyze the provided code to identify potential vulnerabilities, and, for example, the second service 104 may scan open-source libraries to identify license issues or required updates. In addition or alternatively, the second service 104 may use machine learning techniques to identify errors or vulnerabilities in the provided code.

Figure 2:
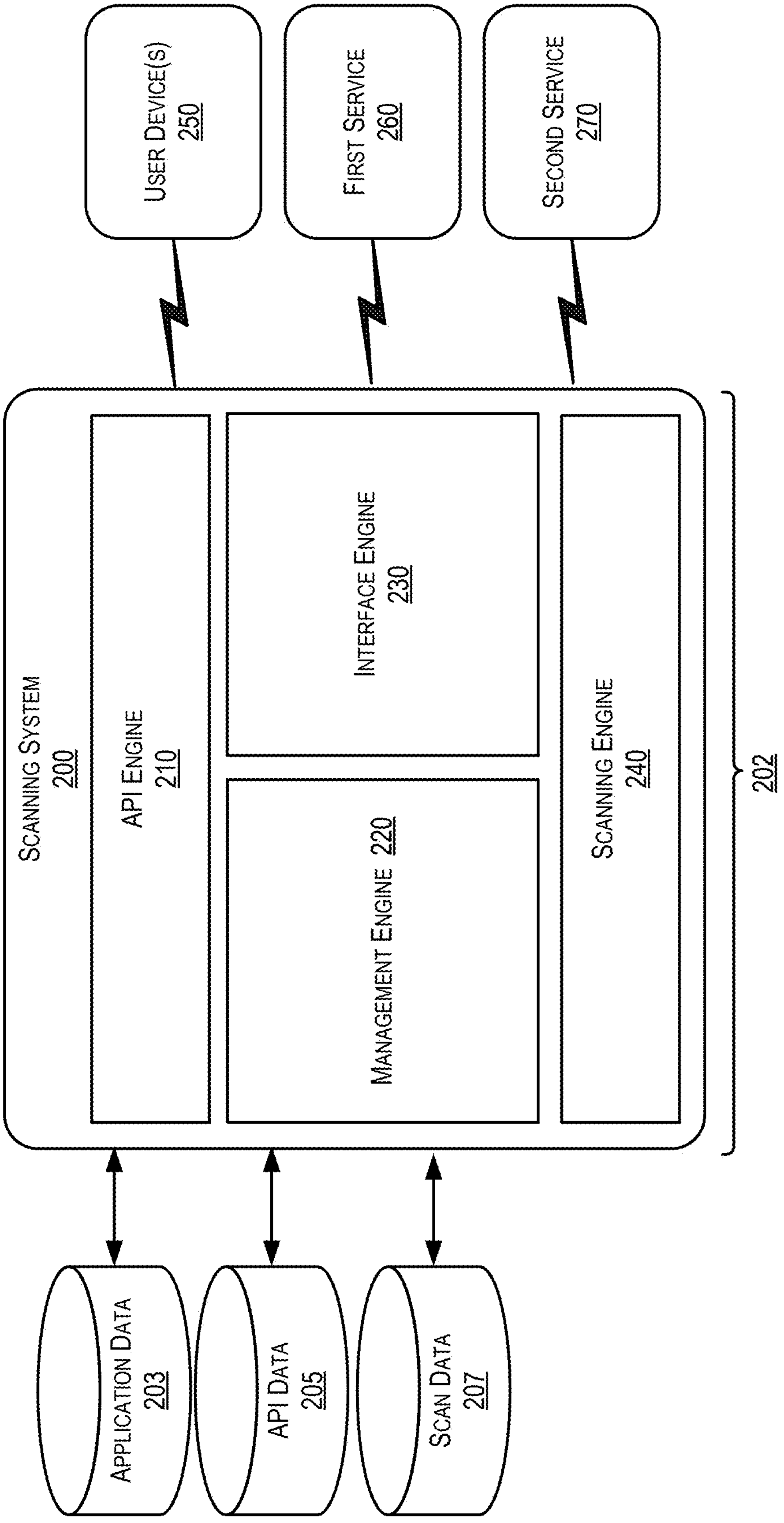
FIG. 2 is a schematic diagram of an example computer architecture for the scanning system, including a plurality of engines that may perform functions according to at least one embodiment.

FIG. 2 is a schematic diagram of an example computer architecture for the scanning system 200, including a plurality of engines 202 that may perform functions in accordance with at least one embodiment. The plurality of engines 202 can include any combination of any number of an application programming interface engine 210, a management engine 220, an interface engine 230, and a scanning engine 240. The engines 202 may be software engines, hardware engines, or a combination thereof. If the engines are software engines, the engines can be embodied on a computer readable medium and processed by a processor in any of the computer systems described herein. It should be noted that any engine or data store described herein, may be, in some embodiments, be a service responsible for providing functionality corresponding to the engine described below. The engines 202 may be execute as part of the scanning system 200, or the engines 202 may exist as separate engines or services external to the scanning system 200. Scanning system 200 can be part of the first network 106 or the second network 112 in various embodiments. In some embodiments, the engines 202 may be executed by the same or different computing devices, as a service, as an application, or the like.

In the embodiment shown in the FIG. 2, data stores such as application data 203, application programming interface data 205, and scan data 207 are shown, although data can be maintained, derived, or otherwise accessed from various data stores, either remote or local to the scanning system 200, to achieve the functions described herein. The scanning system 200, as shown in FIG. 2, includes various engines such as an application programming interface engine 210, a management engine 220, an interface engine 230, and a scanning engine 240. The scanning system can communicate information to and from user device(s) 250, first service 260 and/or second service 270. Some functions of the engines 210-240 and systems 250-270 are described below. However, for the benefit of the reader, a brief, non-limiting description of each of the engines and systems are provided in the following paragraphs. In accordance with at least one embodiment, a process for establishing an application programming interface is provided.

In at least one embodiment, the scanning system 200 includes the API engine 210. An application programming interface can be a set of rules or protocols that permit communication between software. For example, an application programming interface can permit communication between two or more applications. The API engine 210 can access information about applications from application data 203. In some embodiments, the API engine 210 can build and deploy an application programming interface using a specification, and, for example, a specification may be stored in API data 205. For example, the API engine 210 may be instructed (e.g., by a user device 250) to clone (e.g., replicate) an existing API for an application of the first service 260. The API engine 210 can access information that identifies a particular API specification that is used by the application from application data 203, and the engine can retrieve the specification from the API data 205 using this information. The API engine 210 can create cloned API using the specification from API data 205. The application data 203 may include private internet protocol addresses for the applications within their respective networks.

The scanning system 200 can include a management engine 220. The management engine 220 can perform various functions to clean and manage application data 203, API data 205, and scan data 207. For example, the management engine 220 may deduplicate, transform, or otherwise manage the data within these databases. In addition, the management engine 220 may verify access credentials for external devices or services such as user device(s) 250, first service 260, and second service 270. The management engine 220 may also use permissions associated with the access credentials to permit or restrict access to one or more parts of the scanning system.

A request for an application programming interface may be provided to the scanning system 200 via a user interface. For example, the interface engine 230 may provide a user interface to one or more user device(s) 250. A user device 250 can identify an application that is to be scanned via the user interface. The user device 250 may identify an application programming interface for the scan via the user interface, and the interface engine 230 can provide information identifying the application programming interface to the API engine 210.

The scanning system 200 can include a scanning engine 240. The scanning engine 240 may initiate a scan of an application in the first service 260 by identifying the application that is to be scanned to the second service 270. The scanning engine 240 may provide information that identifies an application programming interface for the scan to the second service 270. Identifying the application that is to be scanned may include providing any combination of any number of an address of the application, a name or other identifier of the application, and an access credential for the first service. In some embodiments, the scanning engine 240 may store data about the vulnerability scan as scan data 207. This data can include a time of the scan and the results of the scan.

Figure 3:
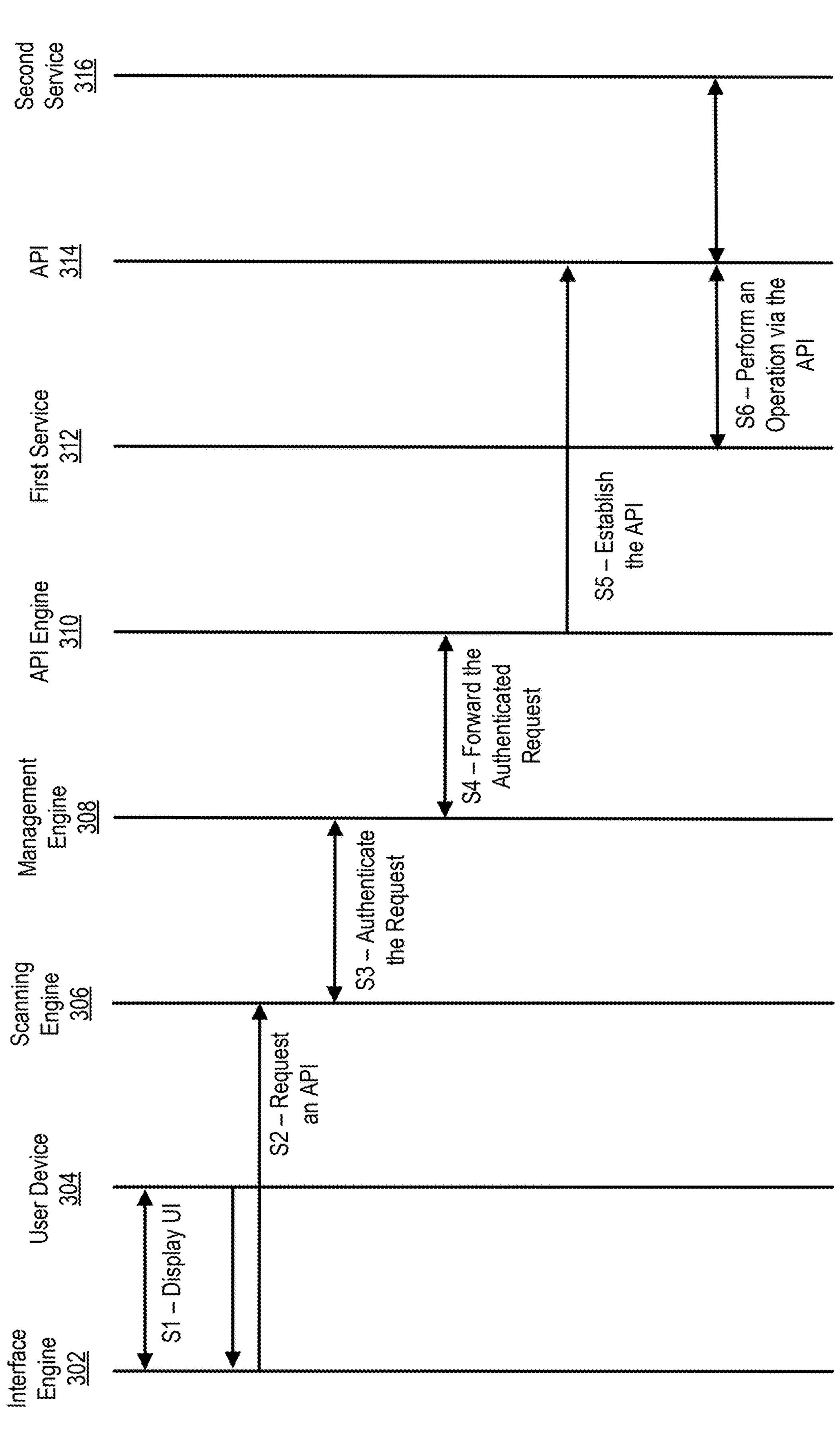
FIG. 3 is a sequence diagram showing a technique for associating an application programming interface with an application according to at least one embodiment.

FIG. 3 is a sequence diagram 300 showing a technique for object identification according to various embodiments. At S1, the interface engine 302 can cause a user device 304 to display a user interface (UI). The user interface can be any of the user interfaces described with reference to FIGS. 4-7. The user interface may be displayed in response to a request from the user device 304 to the interface engine 302.

At S2, the user device 304 can request an application programming interface via the user interface from S1. The request can be an instruction to associate application(s) with an application programming interface. The request can be a request for a vulnerability scan, and the request can identify application(s) that are to be scanned (e.g., target application (s)). The target application can be an application of the first service 312 or an application of the second service 316. The request can identify an existing application programming interface that is to be associated with the target application, or an application programming interface configuration for a new API that is to be created and associated with the target application. The application can include any of the repositories and libraries that are associated with the application, and the target application can include all code that is necessary to execute the application. In some embodiments, the target application can include any combination of any number of individual applications.

At S3, the request can be authenticated by the management engine 308. The request at S2 can include an authentication credential such as an account identifier, a password, a cryptographic token, etc. The request can include a target address (e.g., a private address within a network) and an application name or identifier. The management engine 308 may authenticate the request by verifying that the target address corresponds to the application name or identifier (e.g., an application with the application identifier is associated with the address).

At S4, the authenticated request can be forwarded to the API engine 310. The request can identify a target application for a scan and an application programming interface. The request can include an instruction to reassign the identified application programming interface to facilitate communication with the application, or the request can be an instruction to create a new application programming interface with the same configuration as the identified application programming interface.

At S5, the API engine 310 can establish the application programming interface 314. Establishing the application programming interface 314 can include changing the API's association from a first application to the application identified in the request. In some embodiments, establishing the application programming interface 314 can include creating a new API and associating the API with the application in the request. The new application programming interface can be created with a configuration of an existing API that is identified in the request.

At S 6, an operation can be performed via the application programming interface 314. For example, the operation can include communicating one or more files between the first service 312 and the second service 316 via the application programming interface 314. The files can be communicated in response to a request in some embodiments. The operations can include performing a vulnerability scan of either the first service 312 or the second service 316, and the vulnerability scan can be performed by the first service 312 or the second service 316.

Figure 4:
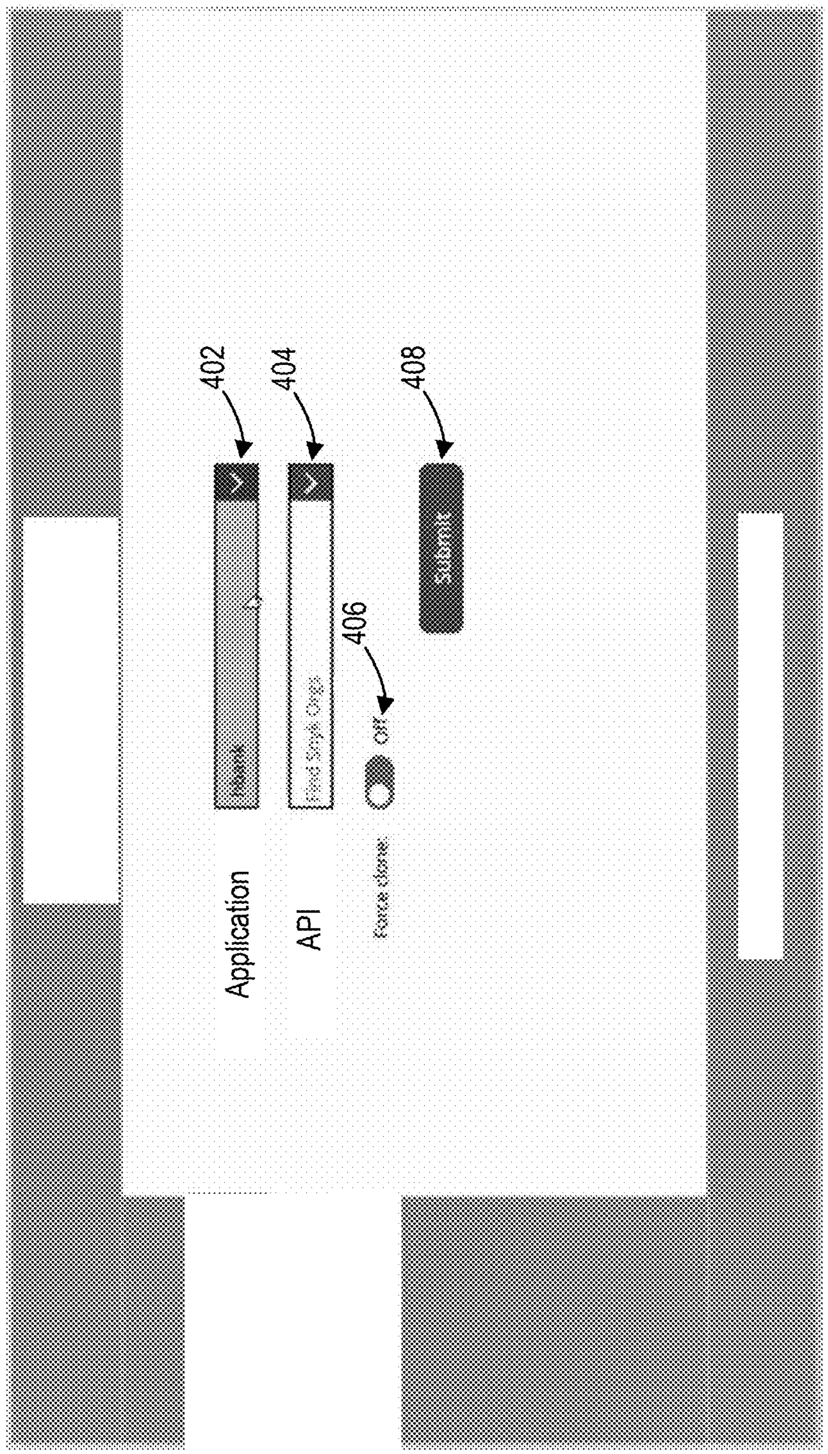
FIG. 4 is a simplified diagram of a graphical user interface for establishing an application programming interface according to at least one embodiment.

FIG. 4 is a simplified diagram of a graphical user interface (GUI) 400 for associating an application programming interface with an application according to at least one embodiment. The graphical user interface 400 shown in FIG. 4 can be used to associate an application with an application programming interface as described in FIG. 5.

The graphical user interface 400 can be displayed by a first service, and, for example, the graphical user interface can be provided by the first service to a web browser application on a computing device. Graphical element 402 can be used to select a first application of a first service, and graphical element 404 can be used to select an application programming interface of a second service. The application programming interfaces (APIs) that are selectable via graphical element 404 can be existing APIs that may already be associated with an application. Graphical element 406 can be used to override any existing associations between the application programming interface and application that are selected using graphical element 402 and graphical element 404. Graphical element 408 can be used to submit a request to associate the first application that was selected using graphical element 402 and the application programming interface that was selected using graphical element 404.

Figure 5:
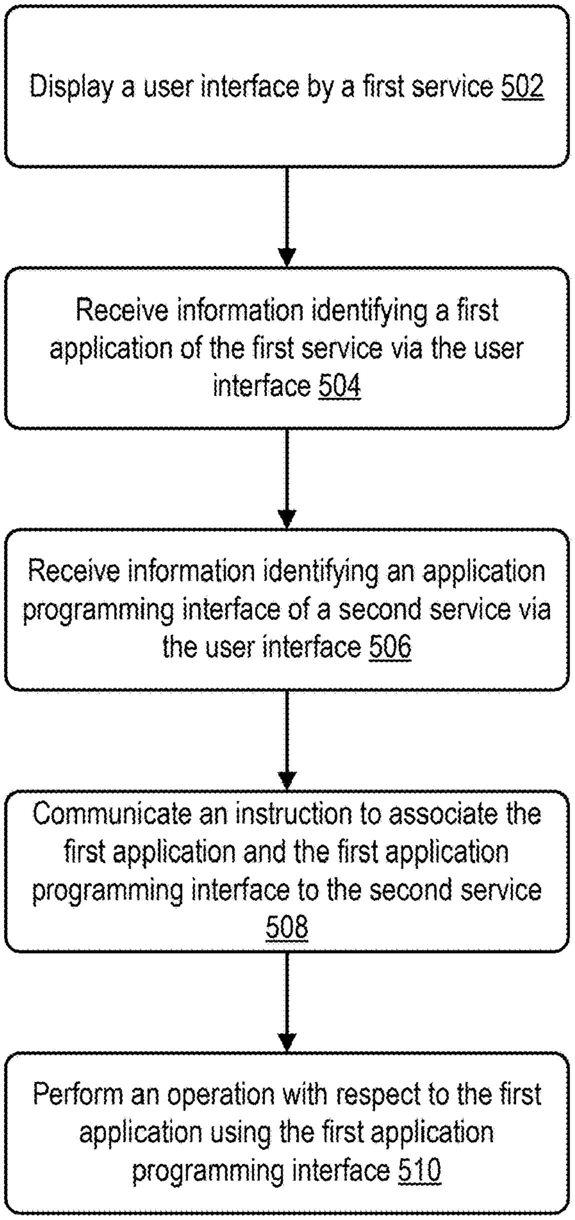
FIG. 5 is a block diagram illustrating an example method for using a graphical user interface to associate an application and an application programming interface according to at least one embodiment.

FIG. 5 is a block diagram illustrating an example method 500 for using a graphical user interface to associate an application and an application programming interface according to at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion the scanning system 200 of FIG. 2. In some embodiments, method 500 may be executed by components of Computing Device 900 of FIG. 9. Method 500 may be performed using a graphical user interface such as GUI 400 and GUI 600.

At block 502, a user interface can be displayed by a first service. The user interface can be graphical user interface 400 of FIG. 4 or graphical user interface 600 of FIG. 6 in various embodiments. The first service can be first service 102 of FIG. 1.

At block 504, information identifying a first application of the first service can be received via the user interface. The information can be received via graphical element 402 of FIG. 4, and the first service can be first service 102 of FIG. 1.

At block 506, information identifying an application programming interface of a second service can be received via the user interface. The information can be received via graphical element 404 of FIG. 4, and the second service can be second service 104 of FIG. 1.

At block 508, an instruction to associate the first application and the first application programming interface can be communicated to the second service. The instruction can be communicated in response to selecting graphical element 408 of FIG. 4. The request can cause the second service to associate the first application programming interface with the first application. If graphical element 406 of FIG. 4 is selected, the instruction can cause the second service to change the association of the first application programming interface from an existing application to the first application.

At block 510, an operation with respect to the first application can be performed using the first application programming interface. The operation can be a vulnerability scan, and the operation can include providing the second service with access to a repository of the first service via the application programming interface.

Figure 6:
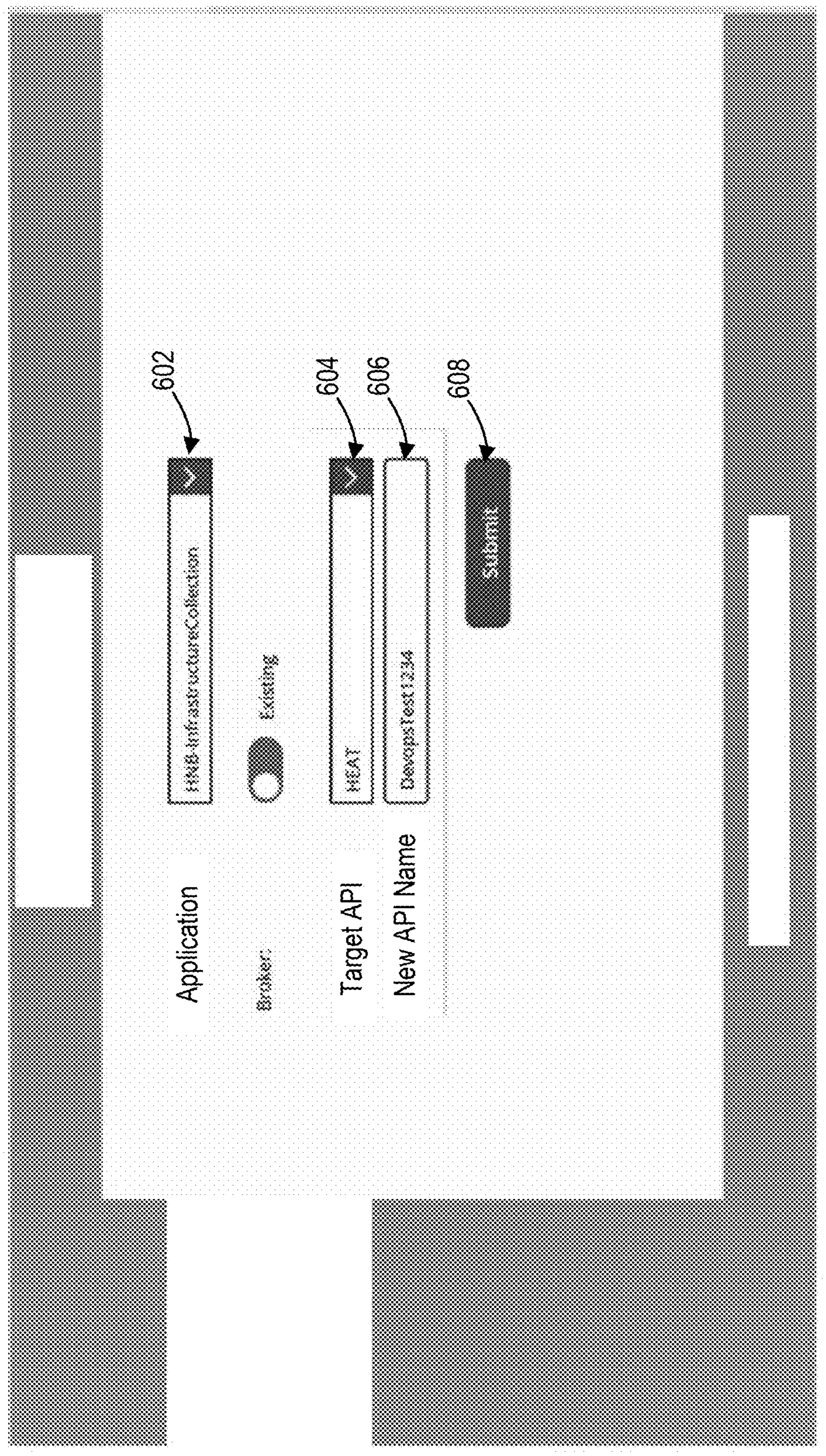
FIG. 6 is a simplified diagram of a graphical user interface for creating an application programming interface according to at least one embodiment.

FIG. 6 is a simplified diagram of a graphical user interface 600 for creating an application programming interface according to at least one embodiment. The graphical user interface 600 shown in FIG. 6 can be used to associate an application with an application programming interface as described in FIG. 7.

The graphical user interface 600 can be displayed by a first service, and, for example, the graphical user interface can be provided by the first service to a web browser application on a computing device. Graphical element 602 can be used to select a first application of a first service. Graphical element 604 can be used to select an application programming interface of a second service that is to be copied. The copied application programming interface can be given a name using graphical field 606. The application programming interfaces (APIs) that are selectable via graphical element 604 can be existing APIs. Graphical element 408 can be used to submit a request to generate a new application programming interface with the settings from the API identified using the graphical element 604 and the name that is provided via graphical field 606. The settings can include source control integrations, container registry integrations, container orchestrator integrations, platform as a service integrations, serverless integrations, notification integrations, policies, language settings, infrastructure as a code settings, and vulnerability scan settings. The request can associate the copied application programming interface with the application that is identified using graphical element 602.

Figure 7:
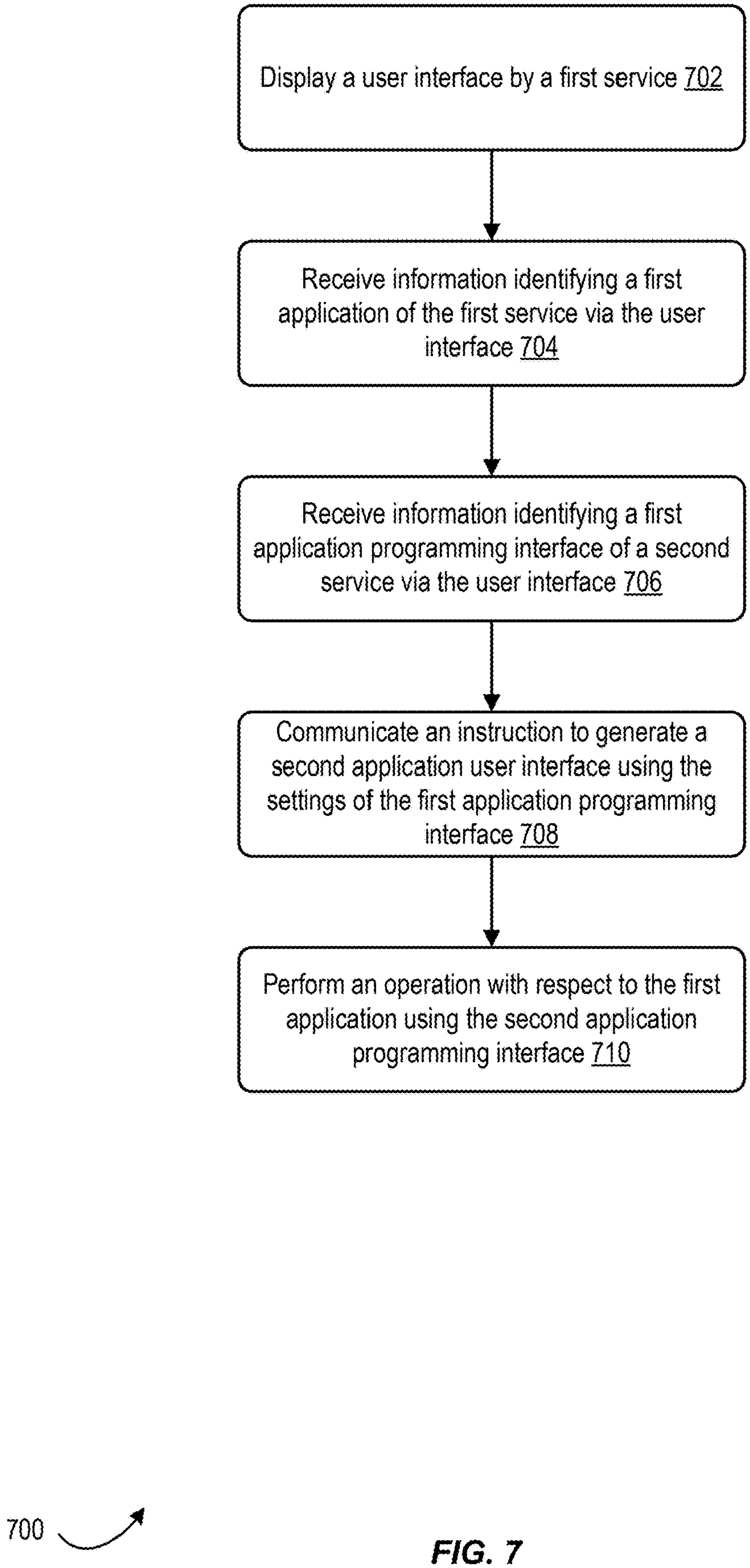
FIG. 7 is a block diagram illustrating an example method for using a graphical user interface to copy an application programming interface according to at least one embodiment.

FIG. 7 is a block diagram illustrating an example method 700 for using a graphical user interface to copy an application programming interface according to at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 5. The operations of method 700 may be performed by any suitable portion the scanning system 200 of FIG. 2. In some embodiments, method 700 may be executed by components of Computing Device 900 of FIG. 9. Method 700 may be performed using a graphical user interface such as GUI 400 and GUI 600.

At block 702, a user interface can be displayed by a first service. The user interface can be graphical user interface 400 of FIG. 4 or graphical user interface 600 of FIG. 6 in various embodiments. The first service can be first service 102 of FIG. 1.

At block 704, information identifying a first application of the first service can be received via the user interface. The information can be received via graphical element 602 of FIG. 6, and the first service can be first service 102 of FIG. 1.

At block 706, information identifying an application programming interface of a second service can be received via the user interface. The information can be received via graphical element 604 of FIG. 6, and the second service can be second service 104 of FIG. 1.

At block 708, an instruction to generate a second application programming interface can be communicated to the second service. The instruction can be communicated in response to selecting graphical element 608 of FIG. 6. The request can cause the second service to associate the second application programming interface with the first application. The second application programming interface can be assigned a name that was provided via graphical field 606 of FIG. 6.

At block 710, an operation with respect to the first application can be performed using the second application programming interface. The operation can be a vulnerability scan, and the operation can include providing the second service with access to a repository of the first service via the second application programming interface.

Figure 8:
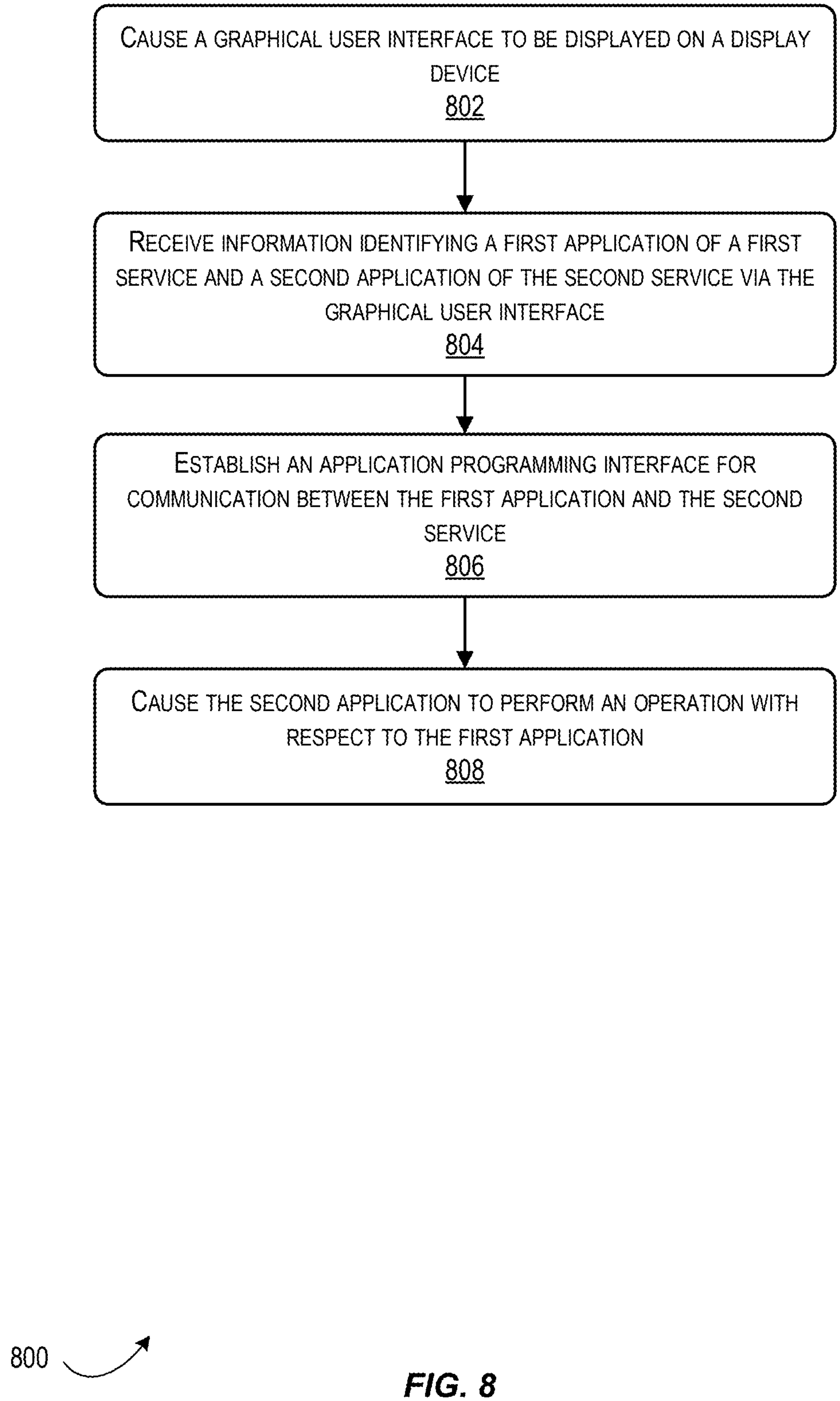
FIG. 8 is a block diagram illustrating an example method for establishing an application programming interface according to at least one embodiment.

FIG. 8 is a block diagram illustrating an example method 800 for establishing an application programming interface according to at least one embodiment. A non-transitory computer-readable storage medium may store computer-executable instructions that, when executed by at least one processor, cause at least one computer to perform instructions comprising the operations of the method 800. It should be appreciated that the operations of the method 800 may be performed in any suitable order, not necessarily the order depicted in FIG. 8. Further, the method 800 may include additional, or fewer operations than those depicted in FIG. 8. The operations of method 800 may be performed by any suitable portion the scanning system 200 of FIG. 2. In some embodiments, method 800 may be executed by components of Computing Device 900 of FIG. 9. Method 800 may be performed using a graphical user interface such as GUI 400 and GUI 600.

At block 802, a computer system can cause a graphical user interface to be displayed on a display device. The graphical user interface can include a first field for displaying applications of a first service and a second field for displaying applications of a second service. The second service can be provided by a cloud service provider that can be subscribed to by one or more customers of the cloud service provider. In some embodiments, the first service can be a customer of the cloud service provider.

At block 804, information identifying a first application of the first service and information identifying a first application programming interface of the second service can be received. The information can be received via the graphical user interface that is displayed at 802. The information identifying the first application programming interface can include any combination of a name for the application programming interface, an identifier and an authorization token. The information can include settings for the first application programming interface including source control integrations, container registry integrations, container orchestrator integrations, platform as a service integrations, serverless integrations, notification integrations, policies, language settings, infrastructure as a code settings, and vulnerability scan settings.

At block 806, communication between the first application and the second service can be established. The first application can be an application of the first service. Establishing communication can include causing the second service to create a second application programming interface using the information identifying the first application interface. Establishing communication can also include instructing the second service to associate the first application and the second application programming interface. The instruction can include the authorization token and the identifier for the first application programming interface. Establishing communication can include instructing the second service to associate the first application and the first application programming interface. In some embodiments, the second service can be instructed to change an association for the first application programming interface from an existing application to the first application.

At block 808, the second service can be caused to perform an operation with respect to the first application. The operation can be a vulnerability scan of the first application. The first service and/or the computer system can enable the second service to perform a security vulnerability scan of the first application. Enabling the second service to perform a security vulnerability scan can include providing code to the second service that when executed causes the second service to perform a security vulnerability scan of the first application. Enabling the second service to perform a security vulnerability scan can include providing permission to perform a scan of the first application to the second service. Enabling the second service to perform a security scan of the first application can include enabling integration between the first service and the second service that permits a security vulnerability scan. Performing a vulnerability scan may mean that the first service may provides the second service with access to a code repository for the first application. Performing the vulnerability scan may mean that the first service identifies information that identifies software packages that are associated with the second application, and the first service can communicate this information to the second service via an application programming interface.

Figure 9:
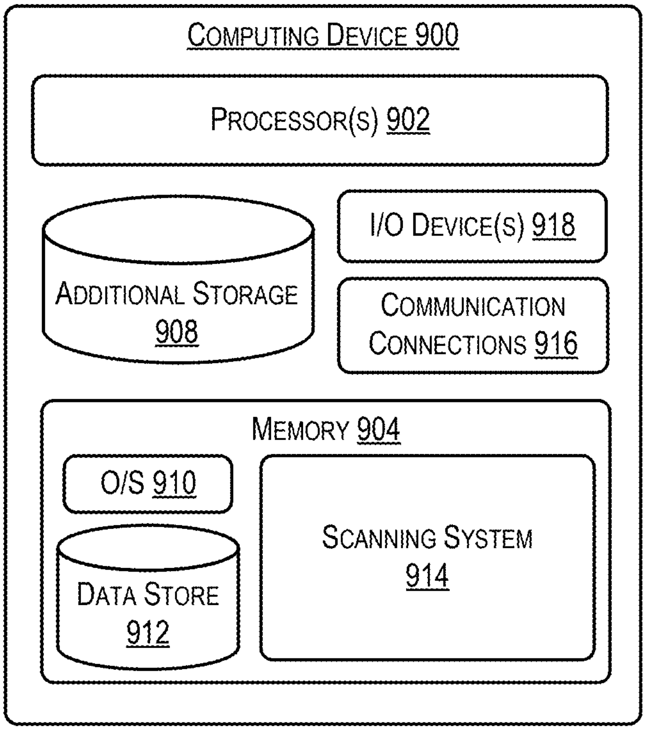
FIG. 9 illustrates an example computing device that may implement the techniques disclosed herein.

FIG. 9 illustrates an example computing device 900 that may implement the methods disclosed herein. In some embodiments, the computing device 900 may include one or more processors (e.g., processor(s) 902). The processor(s) 902 may be implemented in hardware, computer-executable instructions, firmware, or combinations thereof. Computer-executable instruction or firmware implementations of the processor(s) 902 may include computer-executable or machine-executable instructions written in any suitable programming language.

Computing device 900 may include memory 904. The memory 904 may store computer-executable instructions that are loadable and executable by the processor(s) 902, as well as data generated during the execution of these programs. The memory 904 may be volatile (such as RAM) and/or non-volatile (such as ROM, flash memory, etc.). The computing device 900 may include additional storage 906, which may include removable storage and/or non-removable storage. The additional storage 906 may include, but is not limited to, magnetic storage, optical disks and/or tape storage. The disk drives and their associated computer-readable media may provide non-volatile storage of computer-readable instructions, data structures, program engines, and other data for the computing devices. In some implementations, the memory 904 or additional storage 906 may individually, or collectively, include multiple different types of memory, such as SRAM, DRAM, or ROM.

The memory 904 and/or additional storage 908 may be examples of computer-readable storage media. Computer-readable storage media may include volatile, or non-volatile, removable or non-removable media implemented in any method or technology for storage of information such as computer-readable instructions, data structures, program engines, or other data. In some embodiments, memory 904 and the additional storage 908 are examples of computer storage media. Memory 904 and/or additional storage 908 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 900. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 904 may include an operating system 910 and one or more data stores 910, and/or one or more application programs, engines, or services for implementing the features disclosed herein, such as the features provided by the scanning system 914 (an example of the scanning system 200 of FIG. 2).

The computing device may also contain communications connection(s) 916 that allow the computing device 900 to communicate with a stored database, another computing device, a server, user terminals and/or other devices (e.g., via one or more networks, not depicted). The computing device may also include I/O device(s) 918, such as a keyboard, a mouse, a pen, a voice input device, a touch input device, a display, speakers, a printer, etc.

A user may wish to provision an application programming interface to permit a vulnerability scan of an application in a first service. The application programming interface may permit a second service with access to a repository so that the second service can check the application's code and software packages. To generate the application programming interface, a user can identify the application and an existing application programming interface that permits communication between the services. The user can use input to the interface to cause the services to generate a new application programming interface using the existing API's settings and the application's access credentials. The user may also cause the existing application programming interface to be reassigned to allow communication with the application. After establishing the application programming interface, the second service can perform a vulnerability scan of the application.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

causing, by a computer system, a graphical user interface to be displayed on a display device, wherein the graphical user interface includes a first field for displaying applications of a first service and a second field for displaying application programming interfaces (APIs) of a second service;

receiving, by the computer system and via the graphical user interface, a request to perform a security vulnerability scan, the request comprising information identifying a first application of the first service and information identifying a first application programming interface of the second service;

authenticating, by the computer system, the request by verifying that a target address included in the request corresponds to the information identifying the first application;

establishing, by the computer system, communication between the first application and the second service by:

retrieving, by the computer system, a specification using the information identifying the first application programming interface;

causing, by the computer system, the second service to create a second application programming interface using the specification, the second application programming interface including one or more settings of the first application programming interface;

instructing, by the computer system, the second service to associate the first application and the second application programming interface; and establishing the communication between the first application and the second service via the second application programming interface; and causing, by the computer system, the second service to perform the security vulnerability scan of the first application via the second application programming interface.

2. The method of claim 1, wherein the information identifying the first application programming interface comprises:

an identifier; and an authorization token.

3. The method of claim 1, wherein causing the second service to perform the security vulnerability scan comprises:

providing, by the computer system and via the first application programming interface, the second service with access to a code repository of the first application.

4. The method of claim 1, wherein causing the second service to perform the security vulnerability scan comprises:

identifying, by the computer system, information identifying software packages associated with the first application; and communicating, by the computer system and via the first application programming interface, the information identifying the software packages to the second service.

5. The method of claim 1, wherein the second service is provided by a cloud service provider, wherein the second service can be subscribed to by one or more customers of the cloud service provider.

6. The method of claim 1, wherein performing the security vulnerability scan further comprises storing scan data.

7. The method of claim 6, wherein the scan data comprises at least a time of the security vulnerability scan and results of the security vulnerability scan.

8. A computer system, comprising:

one or more memories; and one or more processors in communication with the one or more memories and configured to execute instructions stored in the one or more memories to perform operations to:

cause, by the computer system, a graphical user interface to be displayed on a display device, wherein the graphical user interface includes a first field for displaying applications of a first service and a second field for displaying application programming interfaces (APIs) of a second service;

receive, by the computer system and via the graphical user interface, a request to perform a security vulnerability scan, the request comprising information identifying a first application of the first service and information identifying a first application programming interface of the second service;

authenticating, by the computer system, the request by verifying that a target address included in the request corresponds to the information identifying the first application;

establish, by the computer system, communication between the first application and the second service by:

retrieving, by the computer system, a specification using the information identifying the first application programming interface;

causing, by the computer system, the second service to create a second application programming interface using the specification, the second application programming interface including one or more settings of the first application programming interface;

instructing, by the computer system, the second service to associate the first application and the second application programming interface; and establishing the communication between the first application and the second service via the second application programming interface; and cause, by the computer system, the second service to perform the security vulnerability scan of the first application via the second application programming interface.

9. The computer system of claim 8, wherein the information identifying the first application programming interface comprises:

an identifier; and an authorization token.

10. The computer system of claim 8, wherein causing the second service to perform the security vulnerability scan comprises operations to:

provide, by the computer system and via the first application programming interface, the second service with access to a code repository of the first application.

11. The computer system of claim 8, wherein causing the second service to perform the security vulnerability scan comprises operations to:

identify, by the computer system, information identifying software packages associated with the first application; and communicate, by the computer system and via the first application programming interface, the information identifying the software packages to the second service.

12. The computer system of claim 8, wherein the second service is provided by a cloud service provider, wherein the second service can be subscribed to by one or more customers of the cloud service provider.

13. The computer system of claim 8, wherein performing the security vulnerability scan further comprises storing scan data.

14. The computer system of claim 13, wherein the scan data comprises at least a time of the security vulnerability scan and results of the security vulnerability scan.

15. A non-transitory computer-readable medium storing a plurality of instructions that, when executed by one or more processors of a computer system, cause the one or more processors to perform operations to:

cause, by the computer system, a graphical user interface to be displayed on a display device, wherein the graphical user interface includes a first field for displaying applications of a first service and a second field for displaying application programming interfaces (APIs) of a second service;

receive, by the computer system and via the graphical user interface, a request to perform a security vulnerability scan, the request comprising information identifying a first application of the first service and information identifying a first application programming interface of the second service;

authenticating, by the computer system, the request by verifying that a target address included in the request corresponds to the information identifying the first application;

establish, by the computer system, communication between the first application and the second service by:

retrieving, by the computer system, a specification using the information identifying the first application programming interface;

causing, by the computer system, the second service to create a second application programming interface using the specification, the second application programming interface including one or more settings of the first application programming interface;

instructing, by the computer system, the second service to associate the first application and the second application programming interface; and establishing the communication between the first application and the second service via the second application programming interface; and cause, by the computer system, the second service to perform the security vulnerability scan of the first application via the second application programming interface.

16. The non-transitory computer-readable medium of claim 15, wherein the information identifying the first application programming interface comprises:

an identifier; and an authorization token.

17. The non-transitory computer-readable medium of claim 15, wherein causing the second service to perform the security vulnerability scan comprises operations to:

provide, by the computer system and via the first application programming interface, the second service with access to a code repository of the first application.

18. The non-transitory computer-readable medium of claim 15, wherein causing the second service to perform the security vulnerability scan comprises operations to:

identify, by the computer system, information identifying software packages associated with the first application; and communicate, by the computer system and via the first application programming interface, the information identifying the software packages to the second service.

19. The non-transitory computer-readable medium of claim 18, wherein the second service is provided by a cloud service provider, wherein the second service can be subscribed to by one or more customers of the cloud service provider.

20. The non-transitory computer-readable medium of claim 15, wherein performing the security vulnerability scan further comprises storing scan data.

* * * * *